Figure 1:
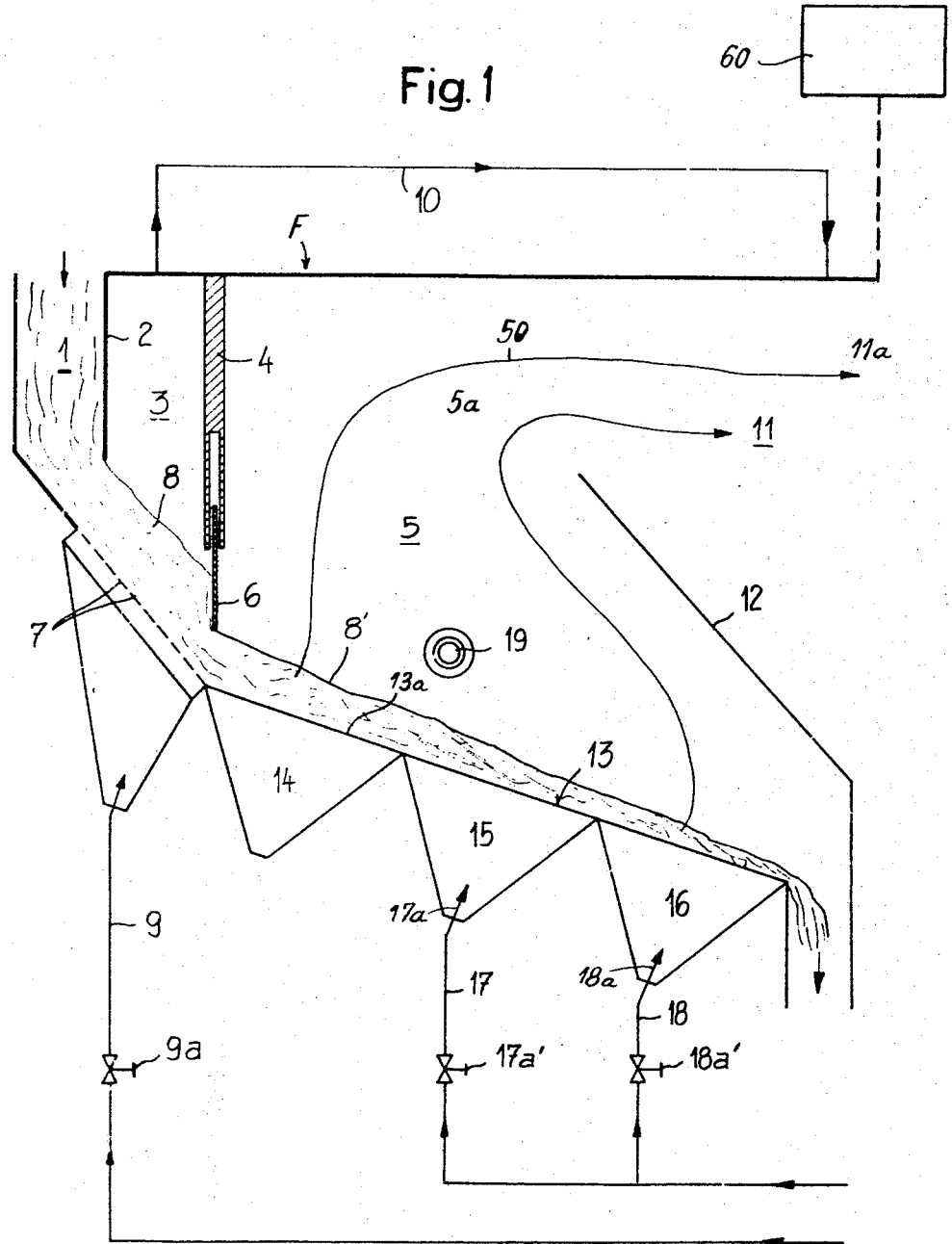

Aug. 1, 1967 T. IACOBOVICI 3,333,556
METHOD FOR THE COMBUSTION OF PARTIALLY DEWATERED SEWAGE SLUDGE
AS WELL AS IMPROVED FURNACE INCORPORATING GRATE FIRING
FOR CARRYING OUT THE AFORESAID METHOD
Filed Nov. 9, 1964 2 Sheets-Sheet 1

INVENTOR.
Theodor Iacobovici
BY Werner W. Kleeman
ATTORNEY

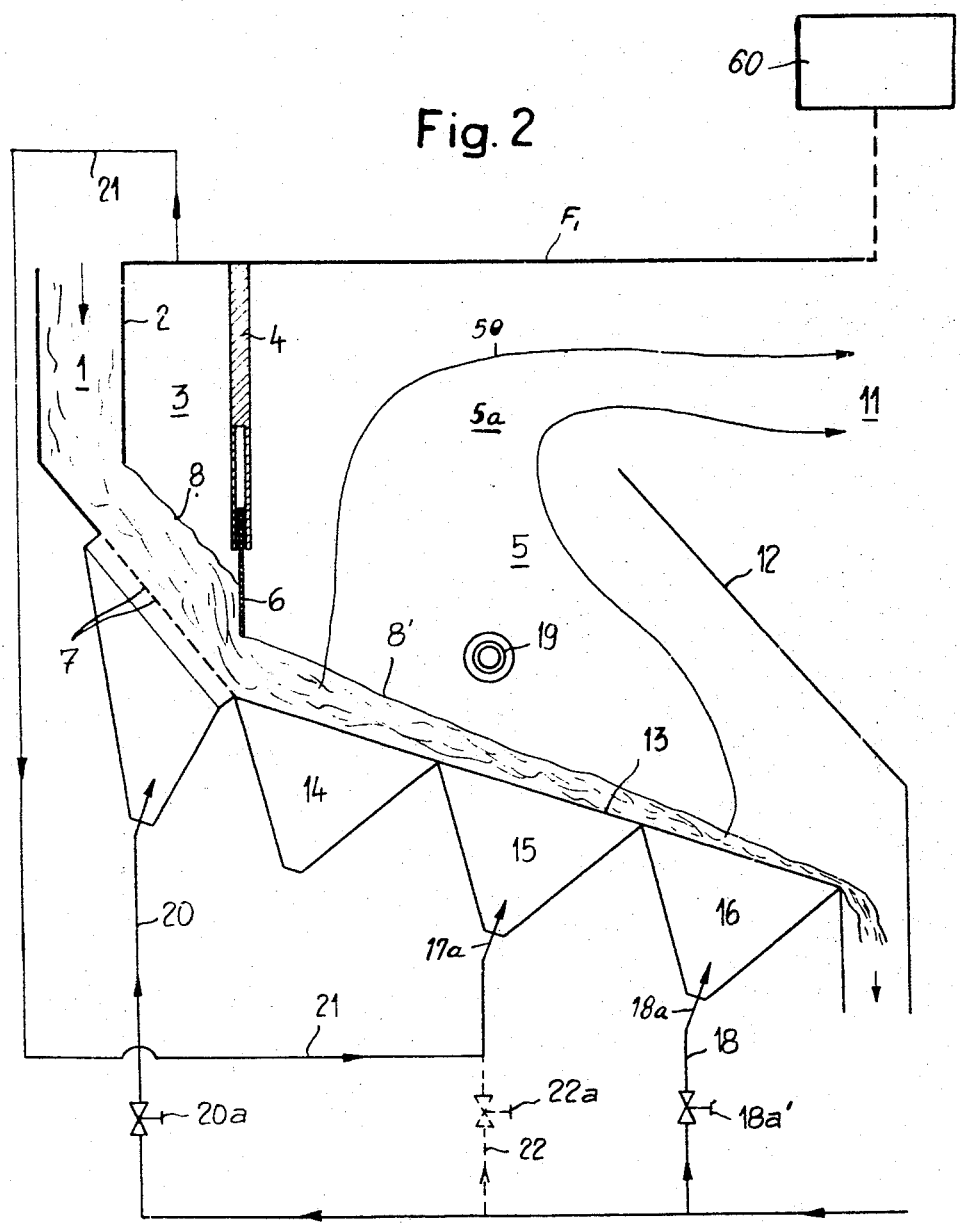

United States Patent Office 3,333,556
Patented Aug. 1, 1967

3,333,556
METHOD FOR THE COMBUSTION OF PARTIALLY DEWATERED SEWAGE SLUDGE AS WELL AS IMPROVED FURNACE INCORPORATING GRATE FIRING FOR CARRYING OUT THE AFORESAID METHOD
Theodor Iacobovici, Zurich, Switzerland, assignor to Von Roll AG., Gerlafingen, Switzerland, a corporation of Switzerland
Filed Nov. 9, 1964, Ser. No. 409,722
Claims priority, application Switzerland, Nov. 11, 1963, 13,807/63
6 Claims. (Cl. 110—15)

The present invention has reference to an improved method for the combustion of refuse materials, especially partially dewatered sludge possessing comparatively low calorific value and a high content of non-combustible constituents, particularly for the destruction of refuse material such as, for instance, sewage sludge, and further pertains to an improved combustion furnace provided with grate firing for carrying out the aforesaid method.

The scope or aim of incinerating sewage sludge, as resulting from a biological water purification process, is its reduction to a mass of residues of small volume, sterile and non-odorant, which may be deposited in the open without polluting the surroundings, the atmosphere and the ground water.

The heretofore known prior art methods and furnaces for fulfilling the aforementioned scope, as practical experience has proven, have the considerable disadvantage that during drying in the combustion furnace, the sludge becomes incrusted at its surface due to the action of heat. Consequently, the combustion is unsatisfactory and, therefore, the desired end result is not obtained, in spite of—additionally—a high consumption of high-value supplementary fuels.

In the case of partially dewatered sewage sludge the danger of incrustation is further favored in that such sludge, usually appearing in the form of cakes due to press-filtering of the watery sludge suspension, must be stored in intermediate bunkers because the conditioning and filtering installations, operating upstream of the combustion furnace proper are being operated practically continuously, whereas the combustion furnace proper generally is operated by shifts and only on working days. Furthermore, interruptions in operation of the furnace are liable to occur. For such reasons, the pressed sludge-cakes must remain for comparatively long periods of time in the intermediate bunker, sometimes up to as much as 14 days, before their delivery to the combustion furnace. At storage depths of 2.5–3.0 meters in the intermediate bunker, the sludge-cakes tend to compact or bag together due to their high specific weight by virtue of their still relatively high water content. Furthermore, an additional compression of the sludge-cakes is brought about when the sludge is removed with grab cranes or the like from the intermediate bunker for their charging into the combustion furnace.

Theoretical considerations and practical experience have indicated that loosening and homogenization of the sludge-cakes are absolutely necessary prior to the actual combustion of the sludge, to positively ensure for a complete combustion of the combustible components. Devices suitable for this purpose are well known to the art, allowing a wide adjustment of the granulation to the requirements most favorable for combustion. Workable solutions have also already been proposed for the preparation of the screenings appearing in sewage treatment plants, typically amounting to approximately 10% to 12% of the pressed sludge. Such contemplate chopping-up the available screenings in wet condition in a comminuting machine or the like suitable for this purpose, and thereafter delivering this chopped-up material to the pressed sludge-cakes located in the intermediate bunker.

Even, if these known techniques for disintegrating and comminuting the combustion material considerably enhance the combustion of preliminarily dewatered sludge, nonetheless the heretofore mentioned disadvantages of incrustation occurring at the surface of the sludge during drying and the unfavorable conditions for combustion resulting therefrom are not completely eliminated.

Accordingly, it is a primary object of the present invention to provide an improved method for the combustion of preliminarily dewatered sludge by means of which the disadvantages of incrustation of the sludge are prevented and a practically total combustion of the combustible constituents thereof ensured, without contamination of the surrounding areas by offensive odors, and with a minimum consumption of high-value additional fuels.

A further more specific object of this invention has reference to an improved method for the destruction, by combustion, of partially dewatered sludge possessing low calorific value and high content of non-combustible constituents, particularly for the destruction of sewage sludge.

The inventive method is generally characterized by the features that the preliminarily dewatered sludge is partially predried in a first stage in a predrying compartment at least approximately separated in a gas tight manner from the combustion compartment, such predrying action being carried out by means of a heating medium delivered to the aforesaid predrying compartment. Thereafter, this partially predried sludge is completely dried in a drying zone arranged in the combustion compartment, the drying being carried out under the action of radiant heat emanating from the combustion compartment, with the thus formed vapor clouds acting as moderator for the drying operation before their mixture with the combustion gases developed in the combustion compartment. The material now completely dry then arrives in a primary combustion zone and then in a subsequent so-called burn-out or final combustion zone and a supplementary fuel is fired in the combustion compartment, while the vapors resulting from predrying are being mixed with the combustion gases, at a location which is disposed at least downstream of the combustion compartment, when referring to the direction of flow of the combustion gases.

In so doing, and in accordance with a preferred mode of execution of the inventive method, predrying of the sludge can take place by means of flue gases diverted from behind the combustion compartment and which are then re-cycled, with the predrying vapors from the predrying compartment being guided into a furnace flue downstream of the combustion compartment.

According to a variant of the inventive method the sludge can be predried by means of a current of hot air, with the predrying vapors being guided in the form of undergrate forced draft into the primary combustion zone of the combustion compartment, there to serve as combustion air.

Additionally, a further aspect of the present invention concerns itself with an improved construction of combustion furnaces for carrying out the aforedescribed inventive methods, such furnace incorporating grate firing. More specifically, the inventive furnace is manifested by the features that the drying zone, primary combustion zone and burn-out zone are arranged in a common combustion compartment, the latter being separated from a predrying compartment arranged in the furnace by means of an intermediate partition wall. Moreover, the predrying compartment operatively communicates by means of a return line with the furnace interior at a location at least at the height of the primary combustion zone with respect to the feed direction of the material to be burnt.

According to a preferred embodiment, the inventive furnace can be constructed such that the predrying compartment is connected via a flue gas return line or conduit with a portion or section of the furnace disposed downstream of the combustion compartment, and the aforementioned vapor return conduit connected with a furnace flue or furnace portion arranged further downsteam of the combustion compartment.

In a further embodiment of the inventive furnace, a hot air conduit is connected to the predrying compartment and the latter connected via a vapor return line entering beneath the combustion zone of the combustion compartment.

Thus, a further important object of this invention is directed to the provision of an improved furnace for the effective destruction by combustion of low value fuels containing a high proportion of non-combustible constituents, particularly for the combustion of partially dewatered sewage sludge.

An additional noteworthy object of the present invention concerns itself with an improved furnace for burning partially dewatered sludge incorporating means for processing the sludge to provide for effective combustion within the furnace under favorable conditions and efficient utilization of the available heat energy, and with a minimum consumption of supplementary fuels.

The inventive methods and the embodiments of combustion furnaces suitable for the performance of the inventive methods are based upon the following considerations:

The preliminarily dewatered pressed sludge-cakes—either fresh or digested sludge—exhibits during its combustion a very peculiar yet predictable behavior due to the fact that its dry substance is an organic fuel of most recent date with a large portion of mineral (non-combustible) materials, while the presence of a high humidity content and the fact that the combustible substances exhibit a large content of volatile constituents are of considerable importance.

It is obvious that, even after preliminary dewatering to about 40% moisture content with known processes, the still high portion of liquid must initially be evaporated before it is possible for ignition to occur with the combustible constituents of the pressed sludge. Furthermore, after the escape and combustion of the volatile components contained in the sewage sludge, the combustion of the remaining "fixed" and now dry combustible constituents is very difficult due to the presence of a large portion of mineral, non-combustible constituents. The increasingly high content of non-combustibles in the fuel bed along the grate not only renders the propagation of ignition within the mass from each of the finally divided combustible particles to the next more difficult, due to the inert mass surrounding these particles, but also considerably hinders the access of the necessary oxygen. For such reasons, combustion conditions upon the grate may be described, at best as exceptionally difficult in comparison to normal practice.

It then becomes or should become evident that these poor conditions, which prevail during the combustion of pressed sludge, are further considerably worsened in that, as already previously mentioned, there is a marked tendency of the fuel bed to incrust or build a coating at its surface while being dried upon the grate, so that combustion air which is blown as undergrate blast through the grate only insufficiently may penetrate the sludge bed, with incomplete combustion as the final result.

Consequently, during the combustion of dewatered sludge, particularly sewage sludge, in a furnace provided with grates, the occurrence of three relatively sharply separated stages or phases in the combustion compartment is quite generally to be expected, to wit:

(a) a drying stage with considerable formation of vapor clouds from the water content of the sludge still remaining after predrying. This drying stage is carried out under the influence of radiant heat from above and/or by the heating effect of a gaseous heating medium (hot air or hot gases) passing through the layer upon the grate. No combustion at all takes place in this stage, and it can be assumed that due to the intensive generation of water vapor relatively low temperatures are obtained—at least within and directly above the layer of fuel—i.e. something above 100° C.

(b) An ignition and primary combustion stage or phase within which ignition initially occurs, specifically after termination of at least local drying, during which the volatile components are driven-off, ignited and burned, under the heating effect of the hot undergrate blast passing from below through the fuel bed. This takes place immediately behind the previously mentioned mass of vapor clouds, when considered with respect to inclination of the grate, while the mass of vapor clouds from the drying phase or stage rise like a wall or curtain upwards from the fuel layer. Within this zone there occurs intensive combustion of the volatile components with intensive flame development, thereby characterizing and sharply limiting this primary combustion phase.

(c) A burn-out or final combustion phase or stage which follows the primary combustion phase, constitutes the last stage within the combustion compartment. At the beginning of this stage the fuel bed now only contains the "fixed" non-volatile combustible material mixed with inert material (ash), in a relationship which progressively drops. Under these conditions a practically flameless combustion can only be expected in this last stage characterized by a glowing fuel bed upon the grate.

Observations in an experimental furnace of the processes occurring during the combustion of preliminarily dewatered sewage sludge have completely confirmed the formation of three relatively sharply separated stages or phases.

Based on interpretation of the facts above, the aforementioned new and improved methods for the combustion of predried sludge have been developed, particularly for sewage sludge, as well as the already mentioned new and improved furnace design for the performance of the inventive methods.

Other features, objects and advantages of the invention will become apparent by reference to the following detailed description and drawings in which:

FIGURE 1 schematically depicts in longitudinal section, details of the predrying compartment and combustion compartment of an incinerating furnace for sewage sludge, with predrying effected by means of re-cycled flue gases, and with the predrying vapors being conducted into a furnace flue disposed downstream of the combustion compartment; and FIGURE 2 schematically depicts in longitudinal section, details of a predrying compartment and combustion compartment of an incinerating furnace for sewage sludge, with the predrying effected by means of hot air, and the predrying vapors being conducted as undergrate blast to the primary combustion zone.

Considering now the drawings in detail, FIGURE 1 schematically illustrates a predrying compartment 3 and combustion compartment 5 of an incinerating furnace F for the destruction of preliminarily dewatered sewage sludge, wherein re-cycled flue gases are utilized for the predrying of the sludge or material to be burned.

More specifically, in this embodiment of furnace F a delivery chute 1 or similar device filled with pressed sludge, is separated by an intermediate wall 2 from the predrying chamber or compartment 3. This predrying compartment 3, in turn, is separated by an intermediate wall or partition member 4 from the combustion compartment 5. A layer-thickness regulator means 6, preferably constructed as a regulating slide, is mounted for vertical displacement at the lower end of the intermediate wall 4. With the aid of this regulator 6 the layer-thickness or quantity of sludge 8 delivered over a suitable gas permeable support 7 to the combustion compartment 5 may be adapted to the actual requirements. This permeable support 7 can, for example, be an inclined bar grate or a suitable mechanical feed grate.

The fuel 8 introduced through the delivery chute 1 is predried upon the support or grate member 7 in the predrying compartment 3, specifically by means of flue gases which are, for instance, at a temperature of about 250° C. to 300° C. These flue gases are advantageously diverted from a rear flue of the furnace, merely generally indicated by reference character 11a, and conducted via a line or conduit 9 from beneath through the grate 7 and through the layer 8 into the predrying compartment 3, then being returned into the furnace. A portion of the moisture content of the fuel 8 is driven-off in this predrying operation providing a first drying phase or stage.

The vapors resulting from the evaporation of a portion of the water content of the sludge have a temperature of just about 100° C., and are conducted via a conduit 10 into a rear flue 11 of the furnace F, the flue 11 being separated from the combustion compartment 5 by an inclined wall 12 or similar expedient. The relatively cold vapors resulting from fuel predrying then mix in the rear flue 11 with the flue gases emanating from the combustion compartment 5, whereby this gas mixture has a temperature of about 750° C. to 800° C., which grants the efficient deodorization of the aforesaid vapors.

The combustion compartment 5 encompasses a suitable feed grate or support 13 advantageously divided into three functionally different zones or regions. Depending upon the nature of the fuel, this feed grate 13 is inclined at a suitable angle with respect to the horizontal. More precisely, the zone or region 14 constitutes a drying zone, the zone or region 15 the main or primary combustion zone, and the zone or region 16 the burn-out or final combustion zone. These three zones 14, 15 and 16 are provided with suitable well known, and for such reason, non-illustrated grate drives. Both zones 15 and 16 are provided with separate undergrate blast systems, generally designated 17a and 18a, respectively. More specifically, hot air at a temperature of about 250° C. to 300° C. is delivered through the pressure systems 17a and 18a via conduits 17 and 18, respectively, to both zones 15 and 16, respectively.

No combustion occurs in the drying zone 14, but only the drying of the combustible material already predried in the predrying compartment 3. In other words, the moisture content still retained in the combustible material 8', is being evaporated under the effect of the radiant heat emanating from the combustion compartment 5. For this reason no undergrate blast is necessary in the drying zone 14 of the feed grate 13. The grate section 13a at the region of the drying zone 14 is protected against the action of heat from above by the layer of combustible material 8' which is still moist at this location. However, as a precautionary measure it would also be possible at this location to supply a cold air current for cooling purposes.

Due to the drying of sludge 8' in the drying zone 14 of the combustion compartment 5 vapor clouds form, slowly ascending as a compact mass, and moving into the combustion compartment 5. Here, they mix with combustion gases of the zones 15 and 16. In so doing, the vapors initially at a temperature of approximately 100° C. gradually assume the terminal temperature prevailing in the combustion compartment 5.

However, the temperatures are much lower along the partition wall 4 towards the relatively "cold" predrying compartment 3. Consequently, the partition wall 4 is still likewise relatively "cool," so that the layer-thickness regulator 6 provided at such partition wall 4 is located in a relatively "cold" environment, thereby working reliably.

The mass of vapor clouds ascending in the drying zone 14 act as moderator for the drying operation due to their imperviousness to radiant heat. As a result, drying proceeds slowly without the danger of the layer 8' located in the combustion chamber 5 becoming incrusted at its surface. Also, the previously mentioned comminution and disintegration of the combustible material 8 prior to infeed into the furnace F further helps to prevent incrustation.

Ignition initially occurs in the primary combustion zone 15 at the region bounding the drying zone 14, and thereafter there occurs intensive combustion, particularly of the volatile constituents of the combustible material. This combustion proceeds with lively flame development. Within a certain safety margin it may be assumed that about 80% to 90% of the combustible material is being burnt here. As already mentioned, hot air at a temperature of about 250° C. to 300° C. and supplied as undergrate blast serves as combustion air in the primary combustion zone 15. Under certain circumstances, however, additional hot air can be blown-in above the grate 13 to serve as secondary air, but for convenience in illustration the necessary means for such have been omitted from the drawing.

A burner 19 positioned at a suitable location in the combustion compartment 5 is provided for starting the cold furnace into operation or as an additional firing means. In the case of digested sludge the burner 19 can advantageously be operated with available sewer gas. Naturally, instead of sewer gas there a different fuel can be used, such as fuel-oil for instance. In the case of fresh undigested sludge supplementary firing is generally superfluous, due to its higher heating value, so that in such case the burner 19 only serves to start the furnace into operation. Under these conditions, as calculations and practical experience have proven, a continuous fire can be maintained under equilibrium conditions in the primary combustion zone 15 within the combustion compartment 5.

In consideration of the changing composition and fluctuations in the ignition quality of the easily volatile, organic constituents in the sludge to be burned, it is recommended, with larger furnace installations, to divide the primary combustion zone 15 into two partial zones (not shown in FIGURE 1) and to equip such partial zones with separate grate drives which are independently adjustable as to their rate of feed, as well as to also provide such with separate delivery means for the infeed of undergrate blast, which are independently controllable, in order to thereby render possible flexible firing, and to insure for a sufficient stability of the firing operation.

In the burn-out or final combustion zone 16 the combustion of the still present "fixed" combustible portions of the sludge takes place. As already mentioned, this burn-out zone 16 is likewise operated with a hot undergrate blast at temperatures of about 250° C. to 300° C. At this location, there occurs a practically flameless combustion. As calculations and practical experience have proven, a temperature of approximately 1000° C. is attained above the grate in the burn-out zone 16, and without having to rely upon any additional infeed of fuel.

Due to the fact that in the burn-out zone 16 the sludge possesses a very high ash content, it is advantageous to provide a sufficient length of this final zone, and with larger furnace installations to sub-divide such into two sub-zones, whereby then, as already mentioned in conjunction with the primary combustion zone 15, there can here also be provided separate and individual controllable grate drives and/or delivery means for the undergrate blasts.

It will further be noted that a return or deflecting means is provided above the burn-out zone 16. In the illustrated embodiment of FIGURE 1, this return or deflecting means is formed by the inclined, intermediate deflecting wall 12, which also separates the rear furnace flue 11 from the combustion compartment 5. Naturally, the deflecting wall 12 need not be flat, as shown by way of example in FIGURE 1, but could also be curved, or could exhibit a shoulder or projection, taking into consideration the desired flow conditions.

Due to the deflecting wall 12 the vapor clouds escaping from the drying zone 14, commingle with the combustion gases generated in the primary combustion zone 15, and with those from the burn-out zone 16 and from the burner 19. As a result, a sufficiently high terminal temperature exists in the combustion compartment 5. The relatively "cold" predrying vapors from the predrying compartment 3 at a temperature of something above 100° C. returned into the furnace F at its rear flue 11 via the conduit 10, mix with the flue gases, whereby, in spite of a dropping of the flue gas temperature, these vapors are still efficiently deodorized.

Advantageously, the delivery conduit 17 for the hot combustion air is provided with a control element e.g. valve 17a' and, in corresponding manner, the conduit 18 for the delivery of combustion air into the burn-out zone 16 is also provided with a control element e.g. valve 18a'. Naturally, in a corresponding manner a regulating or control element e.g. valve 9a can be provided in the line or conduit 9 for the return of the flue gases into the predrying chamber 3, in order to further increase the adaptability and flexibility of the firing operation.

From the foregoing description of the combustion technique according to the invention, it appears clearly that the combustion of the pressed sludge can be maintained in an operational state of equilibrium, with a terminal temperature in the combustion compartment which totally satisfies the requirements for complete freedom from odor of the waste gases leaving the furnace F.

As a general rule, a waste-heat boiler, schematically illustrated at 60 in FIGURE 1, is usually provided downstream of the combustion compartment, specifically for generating boiling steam necessary for the conditioning of the still fluid sludge (containing over 90% water), prior to dewatering by means of press-filtration according to known methods (see e.g. Swiss Patent 353,697).

While retaining the principle method techniques of the invention, it is also possible to use hot air in the furnace for the predrying of the partially dewatered sludge instead of the fed back flue gases, as was the case with the embodiment described in FIGURE 1. Since, in this case, the vapors resulting from predrying, with the exception of water vapor, still contain drying air cooled down by heat transfer, they can be further used in the furnace as combustion air. At a temperature slightly above 100° C., this vapor-air mixture possesses a relatively high heat content in comparison with cold air, so that such heat content can be advantageously utilized during the combustion of the pressed sludge.

The uniqueness of this last variant method developed in light of the previously mentioned considerations resides in the fact, that the quantity of hot drying air used for predrying is adapted to the combustion air requirements for the combustion of the volatile constituents, so that the vapor-air mixture resulting from predrying may be used as undergrate blast only for the primary combustion phase herein explained at the outset (cf. also primary combustion zone 15 of FIGURE 1), in which the volatile components of the combustible material are being burnt. In so doing, not only the escape into the ambient atmosphere of the offensive smelling vapors is prevented, but also the heat economy of combustion and therewith the total efficiency of the combustion furnace is improved.

The possible danger of condensation of the vapor-air mixture leaving the predrying compartment at a temperature slightly above 100° C. in contact with the metallic components of the grate construction for the primary combustion zone may be easily prevented by admixing a certain quantity of hot air.

Under these circumstances for predrying, and according to calculations, a quantity of only approximately 20% of the original moisture content of the pressed sludge can be removed, so that after predrying, the sludge still contains a considerable quantity of water at its entry into the actual combustion compartment, which is then driven off in the subsequent drying stage.

In FIGURE 2, wherein the same reference numerals have again generally been employed for the same or analogous elements, there is schematically depicted such a combustion furnace $F_1$ for the destruction of partially dewatered sewage sludge, wherein hot air is employed for predrying and the predrying vapors are conducted under the primary combustion zone, with the physical structure of the furnace of FIGURE 1 in all other respects generally maintained.

It will be seen that a hot air conduit 20 is connected to the predrying compartment 3 of this furnace $F_1$, through which hot air at a temperature of approximately 250° C. to 300° C. is blown via a non-illustrated blower and a non-illustrated air preheater through the pervious predrying grate 7 into the predrying compartment 3. The predrying compartment 3 is connected via a vapor return line 21 with the primary combustion zone 15 of the combustion compartment 5.

In order to positively safeguard against the danger of possible condensation of the relatively cold predrying vapors in contact with the grate 13 in the region of the primary combustion zone 15, the vapor return line 21 can be connected with the already available hot air system 20, 18 for furnishing the predrying compartment 3 and the burn-out zone 16 with hot combustion air, such being depicted in FIGURE 2 by means of a connecting conduit 22 illustrated in phantom lines. Naturally, in consideration of a sufficiently flexible firing it is advantageous to provide a regulating element at the hot air conduit 22, as such has been shown in FIGURE 2 by the therein illustrated regulating valve 22a for example.

The methods previously described in conjunction with the embodiments depicted in both FIGURES 1 and 2 for the combustion of partially dewatered sludge with low calorific value and high content of non-combustible constituents, especially for the destruction of sewage sludge, due to the moderated drying, present the advantages of a practically total combustion and an effective deodorization of the offensive smelling vapors appearing during combustion, and, more particularly, with a low consumption of high-value supplementary fuels in the case of digested sewage sludge. These advantages are obtained by the use of surprisingly simple means which are based upon an extensive observation of the phenomena occurring during the combustion of the partially dewatered sewage sludge, leading to a surprisingly simple, comparatively inexpensive and operationally reliable design of combustion furnace for the performance of the new and improved method of the invention.

It will further be appreciated that the layer-thickness regulator 6 as provided in the inventive furnaces operates reliably and with considerable longevity since it is disposed in a comparatively "cold" environment. Due to the provision of simple regulating elements in the conduit system, firing of the furnace is flexible and such furnace can be readily accommodated to the changing properties of the introduced material to be burned.

While embodiments of the invention presently preferred have been shown and described above, it is to be distinctly understood that the invention is not limited thereto but may be otherwise variously embodied and practised within the scope of the following claims.

What is claimed is:

1. A combustion furnace of the type utilizing a multi-zone grate firing for the destruction of previously partially dewatered sludge possessing low calorific value and high content of non-combustible constituents, particularly for the combustion of sewage sludge, said furnace including:
- a pre-drying compartment;
- said pre-drying compartment being defined along two sides by first and second gas-tight intermediate walls and along the bottom by a gas-permeable support means;
- delivery shaft means communicating with said first gas-tight intermediate wall and separated from said pre-drying compartment thereby, said delivery shaft means being adapted to receive said previously partially dewatered sludge and disposed to feed said sludge upon said gas-permeable support means;
- supply means for supplying a gaseous heating medium to a location beneath said gas-permeable support means, said supply means pre-drying said sludge upon said gas-permeable support means by expelling vapors therefrom;
- a regulating slide means shaped as a gas-tight slide and displaceably mounted within said second gas-tight intermediate wall;
- a combustion compartment, said combustion compartment being adjacent said pre-drying compartment and separated therefrom in a gas-tight manner by said second intermediate wall and said regulating slide means;
- said combustion compartment including a feed grate means disposed at the bottom of said combustion chamber, said feed grate means being adapted to receive said sludge disposed upon said gas-permeable support means, said regulating slide means regulating the thickness and quantity of sludge received by said feed grate means;
- said feed grate means including, in succession, a drying zone comprising an initial grate portion, a primary combustion zone, and a burn-out zone, with respect to the direction of feed of said sludge;
- said drying zone defining means for drying said layer of sludge received thereon by heat radiation from said combustion compartment, and further defining means to moderate said drying by a mass of vapor clouds produced by said drying means;
- separate hot undergrate blast systems connected with said primary combustion zone and said burn-out zone;
- a first conduit means for returning vapors from said pre-drying compartment to said combustion compartment at a location within said combustion compartment at a height at least equal to the height of said primary combustion zone with respect to the direction of feed of the sludge within the furnace; and
- auxiliary burner means within said combustion compartment for both starting the cold furnace into operation and for providing additional firing means.

2. A combustion furnace as defined in claim 1, further including:
- a furnace portion disposed downstream of said combustion compartment with respect to the direction of feed of said sludge, at which furnace portion the flue gases are at a temperature of at least 300° C.;
- a flue gas return conduit means for interconnecting said furnace portion with said pre-drying compartment;
- a furnace flue disposed downstream of said combustion compartment with respect to the feed of said sludge; and
- said first conduit means communicating with said furnace flue.

3. A combustion furnace as defined in claim 2, further including:
- a waste-water boiler at a position downstream of said combustion compartment; and
- wherein said flue gas return conduit interconnects said pre-drying compartment with said furnace portion at a location disposed behind said waste heat boiler in respect to the feed of the sludge.

4. A combustion furnace as claimed in claim 1, wherein a cold air undergrate blast system is connected with said drying zone of said feed grate means for cooling of said feed grate means.

5. A combustion furnace as defined in claim 1, wherein said supply means for supplying a gaseous medium comprises a hot air supply line, and wherein said first conduit means communicates with said primary combustion zone of said feed grate means, said first conduit means serving as a hot blast supply line of said undergrate blast system connected with said primary combustion zone.

6. A combustion furnace as defined in claim 5, wherein an additional hot air line means is connected with said first conduit means, said additional hot air line means communicating with a common hot air system for furnishing said pre-drying compartment and said burn-out zone of said feed grate means with hot air so as to prevent condensation of said pre-drying vapors in contact with said feed grate means in the region of said primary combustion zone.

References Cited
UNITED STATES PATENTS

| | | | |
|---|---|---|---|
| 2,008,884 | 7/1935 | Tuppen | 110—15 |
| 2,024,652 | 12/1935 | Mortel. | |
| 2,029,576 | 2/1936 | Kolb | 110—15 |
| 2,116,573 | 5/1938 | Harrington | 110—15 |
| 2,389,077 | 11/1945 | Peterson et al. | 110—10 |

FOREIGN PATENTS

| | | |
|---|---|---|
| 356,278 | 9/1931 | Great Britain. |

KENNETH W. SPRAGUE, *Primary Examiner.*